Dec. 29, 1931.  A. E. ARNOLD  1,838,899
ELECTRIC WELDING MACHINE
Filed Jan. 27, 1928  7 Sheets-Sheet 1

Dec. 29, 1931.    A. E. ARNOLD    1,838,899
ELECTRIC WELDING MACHINE
Filed Jan. 27, 1928    7 Sheets-Sheet 2

Inventor
A. E. Arnold
By Blackmore, [Signature] & [Signature]
Attorney

Dec. 29, 1931.  A. E. ARNOLD  1,838,899
ELECTRIC WELDING MACHINE
Filed Jan. 27, 1928   7 Sheets-Sheet 4

Dec. 29, 1931.     A. E. ARNOLD     1,838,899

ELECTRIC WELDING MACHINE

Filed Jan. 27, 1928     7 Sheets-Sheet 5

Inventor

A. E. Arnold

Attorneys

Dec. 29, 1931.　　　A. E. ARNOLD　　　1,838,899

ELECTRIC WELDING MACHINE

Filed Jan. 27, 1928　　7 Sheets-Sheet 6

Inventor
A. E. Arnold
By
Blackmore, Spencer & Hulse
Attorneys

Dec. 29, 1931.  A. E. ARNOLD  1,838,899
ELECTRIC WELDING MACHINE
Filed Jan. 27, 1928   7 Sheets-Sheet 7

Inventor
A. E. Arnold
By Blackmore, Spencer & Hulit
Attorneys

Patented Dec. 29, 1931

1,838,899

UNITED STATES PATENT OFFICE

ALFRED E. ARNOLD, OF PONTIAC, MICHIGAN

ELECTRIC WELDING MACHINE

Application filed January 27, 1928. Serial No. 250,029.

I have devised a welding machine which produces a better weld than prior machines within a shorter time and one which can be operated by ordinary factory labor. The machine is especially designed for use where a plurality of joints are to be welded, the welds being simultaneously effected. However, many of the features employed are susceptible of use where but a single welding operation is performed. Specifically I employ welding apparatus or heads which travel along the seams, the heads preferably being of the type in which the welding metal is in the form of a strip or band and constitutes one electrode while the work constitutes the other. So far as certain features of my invention are concerned other types of welding heads may be substituted if preferred. Likewise the work may be moved instead of the heads although I have found the latter arrangement to be more convenient.

I will first describe in a general way the features of my method of welding which enable me to secure a better weld and will then discuss the controlling mechanism whereby speedy, fool-proof operation is obtained.

It is known that in welding a joint, particularly where a strip of welding metal forms the electrode, it is important that the return path of the welding current lead back along the welded part of the seam, otherwise the magnetic field produced by the current tends to scatter the molten metal before it has time to solidify in the seam. I have employed this principle in the design of my machine not only by reversing the ground connection when the direction of welding is reversed, but also by adjusting the resistance in the paths available for the return flow of current as to cause the flow to take place at all times in the desired direction.

I have likewise found that the path traced by the arc on the work is materially affected by the disposition of magnetic masses along the path. Thus if at one point in the path a larger mass of magnetic material is located at one side than at the other, the path will deviate toward the side on which the larger mass is located, thus producing an irregular weld and at times leaving portions of the seam unwelded altogether. Consequently I have designed my machine so that equal masses of magnetic material are provided on the opposite sides of the seam at all points along the path of travel.

It is evident that the high temperatures incident to arc welding cause local distortion of the article being welded. Where the seams are symmetrically located I find it preferable to perform welding in such manner that the mechanical stresses set up by the heat are symmetrically distributed. This insures that no unbalanced stresses are, in effect, welded into the article and also gives a better weld.

In designing the controlling mechanism I have borne in mind that the machine is to be operated by unskilled workmen and have accordingly guarded against every possible contingency which might arise through a mistake on the part of the operator. The completed machine is consequently fully automatic. The controlling mechanism embodies among others the following features:

The apparatus is designed so that the action of the operator in closing a switch initiates the welding operation causing the arc to be struck and the welding head or heads to travel along the work welding the seam. In order to make it unnecessary for the operator to continue to hold the switch closed throughout the welding operation, I have provided means in the form of a locking master relay, to hold the various circuits closed until the welding is completed.

The welding heads should not be permitted to travel along the seam unless the welding operation is being performed. I have accordingly provided an interlock between the welding circuits and the circuit of the motor which causes travel of the welding heads so that the motor circuit is closed only when both arcs are struck. This is accomplished by making use of the drop in voltage caused by striking the arcs to actuate relays to close the circuit of the travel motors. In order to prevent against interruption of the circuit of the travel motor as a result of variations in the voltage across the arcs, I have arranged my controls so that after the welding operation begins the relays are rendered ineffective.

At the end of the seam it is necessary that the welding apparatus and the travel motors be thrown out of action. I accomplish this by the employment of a limit switch operated at the end of the travel of the welding heads. This switch returns the control circuits to their original positions. At this time it is likewise desirable to retract the electrode wire to permit withdrawal of the work from beneath the welding heads. I have accordingly provided a special circuit energized by a second limit switch momentarily operated at the end of the travel of the heads for causing the electrode feeding mechanism to withdraw the electrode a definite distance from the work.

The machine illustrated is especially designed for welding automobile axle housings. When the seams on one side of the housing are welded it is necessary to turn the housing over to present the other seams to the welding apparatus. If it be assumed that the first seams were welded by movement of the heads from the ends of the housing toward the center, the next operation will be welding of the opposite seams from the center toward the ends. To accomplish this the connections of the travel motor must be reversed. This is done by arranging a reversing switch to be operated by turning over the fixture in which the housing is clamped. At the same time, in order to secure a good weld it is necessary to reverse the ground connection as previously stated. This likewise is accomplished by suitable switches operated by turning over the fixture.

To take care of unforeseen difficulties in the operation of the machine, I have provided an emergency switch which stops the operation of the machine and returns the control circuits to starting position.

My invention also embodies devices for clamping the parts to be welded in position for the welding operation. In the case of axle housings which are of considerable weight, I have preferably provided my machine with power operated clamping devices as well as power operated mechanism to shift the carrier in which the housing is mounted to permit swinging the housing to expose the other seams.

The machine also embodies a convenient arrangement of gearing for moving the heads as well as various other details of construction which will be apparent from the following description.

I have roughly indicated above the component parts of my machine. In doing this I have referred to specific mechanisms such as limit switches, relays, and the like, but it is to be understood that the invention includes within its scope equivalent means for accomplishing the functions of these parts as indicated by the broad terminology used in the claims.

Figure 3a is a section on line 3a—3a of Figure 3, but with parts omitted.

I shall first describe the mechanism for holding the housing sections in the machine for the welding operation.

Figure 3:
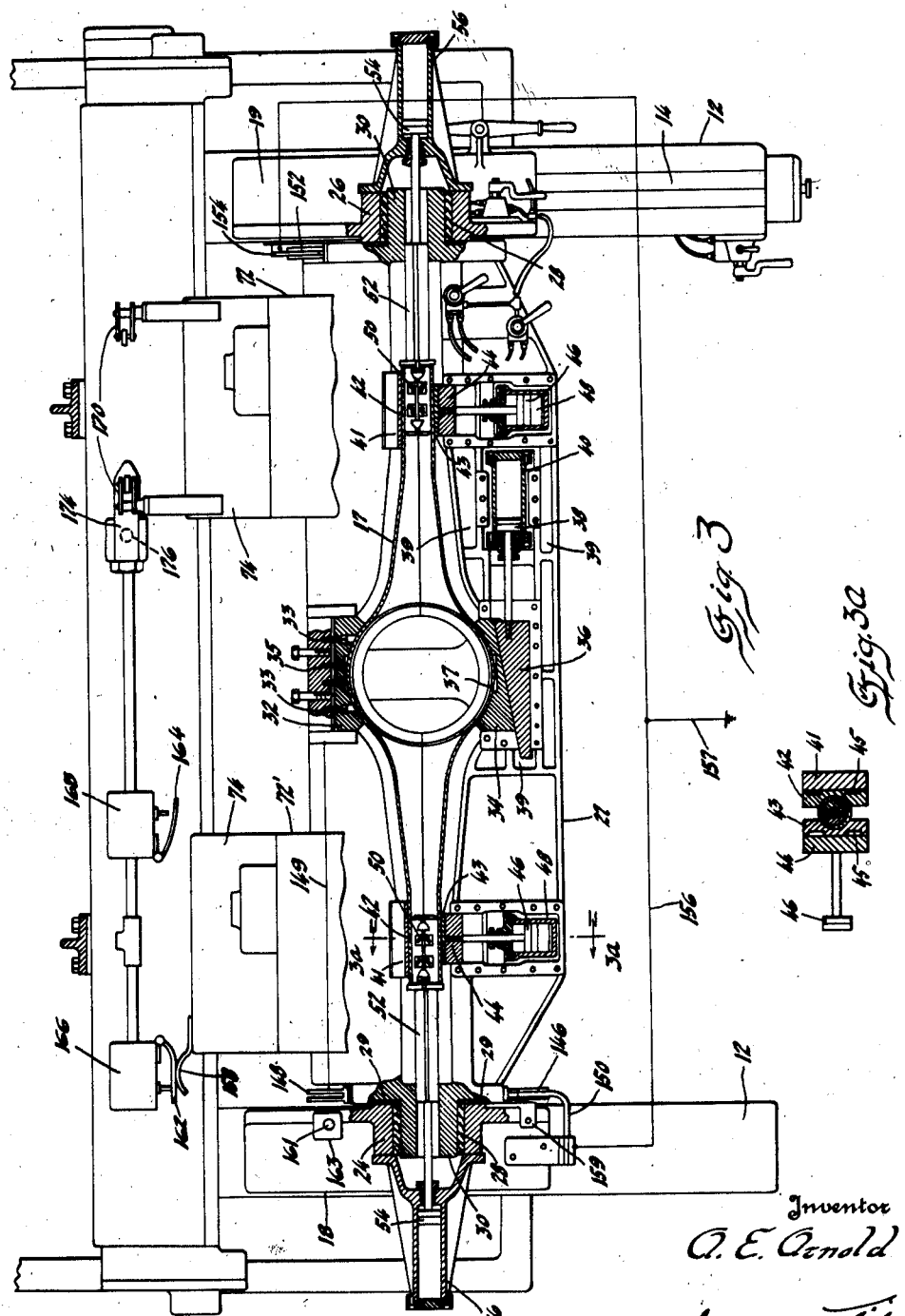
Figure 3 is a horizontal section taken substantially on line 3—3 of Figure 2.

I have indicated the base of my machine by the reference character 10. At the ends of the base I provide parallel supporting members 12, one of which is notched as at 14. Upon this member reciprocates carriage 16 bearing holder 27 in which the axle housing 17 is secured. Suitable stops are provided to limit the extent of movement of the carriage. The carriage 16 is composed of end members 18 and 19 connected by struts 20. End member 19 is provided with a depending projection 22 fitting in the notch 14 in the supporting member to prevent lateral movement of the carriage. The end members 18 and 19 of the carriage carry bearings 24 and 26 respectively in which the holder 27 for the axle housing is received. The bearings 24 and 26 are provided with linings 28 of insulating material, such as wood, best shown in Figure 3, for a purpose to be later explained. Within the linings 28 are received the journals 30 provided on the ends of holder 27. Discs 29 of wood or other insulating material are likewise interposed between the ends of the holder 27 and the adjacent surfaces of the bearings 24 and 26. Holder 27 is provided with a recess within which the sections of the axle housing are received and with devices clearly shown in Figure 3 and now to be described for clamping the housing sections in position for the welding operation. At one side of the centre of the housing where the enlargement for receiving the differential mechanism is located I have provided the holder with a stationary socket 32, and opposite it I have provided a co-operating shiftable socket 34 which may be urged into clamping engagement with the housing by wedge 36 actuated by piston 38 working in cylinder 40. It will be noted that the holder 27 is cored out as at 39 adjacent the ends of the socket 34 and wedge 36, thus introducing an air gap in the electrical path along the holder and consequently increasing its resistance for purposes to be later stated. Similarly at the ends of the housing stationary members 41 are provided and with these co-operate shiftable members 44 actuated by pistons 46 working in cylinders 48. Members 41 and 44 are equipped with sockets 42 and 43 respectively made of Monel metal, a non-magnetic alloy composed of nickel and copper. This metal is employed because of its high heat conductivity for it is essential that the portions of the holder in proximity of the heat of the arc be adequately cooled to prevent fusing. Another reason for the employment of Monel metal is the fact that metal splattered from the weld does not readily adhere to its surface. As shown in Figure 3a, the surfaces of the sockets 42 and 43 that engage the members 41 and 44 are cut away as at 45 providing air gaps which increase the resistance to the flow of electricity thru the sockets and members for purposes to be later explained. Within the ends of the housing are provided expansible mandrels 50 of any preferred design, actuated by reciprocated shafts 52 operated by pistons 54 working in cylinders 56 secured to the respective end members 18 and 19. The mandrels are shown constructed of two semi-cylindrical halves having their meeting surfaces aligned with the meeting edges of the housing halves. In actual practice, I prefer that the meeting surfaces extend at right angles to the meeting edges. The mandrels are preferably made of phosphor bronze. This metal is used because of its high heat conductivity, tending to prevent its fusing to the housing, and because of its high electrical conductivity. The latter quality is important because the mandrels and the shafts 52 form the principal path for the flow of current when welding from the ends toward the center of the housing, as will be later described.

Figure 5:
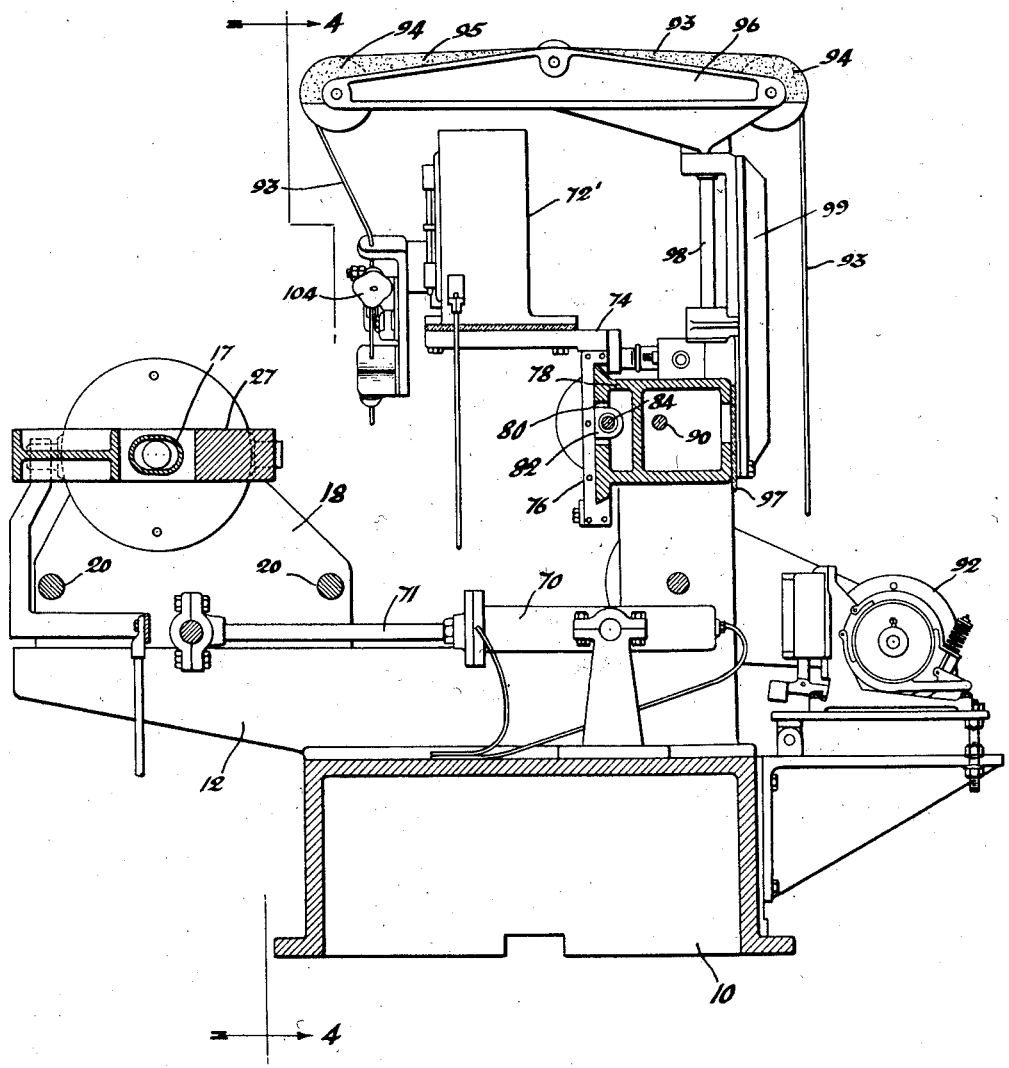
Figure 5 is a vertical section on line 5—5 of Figure 1.
Figure 6:
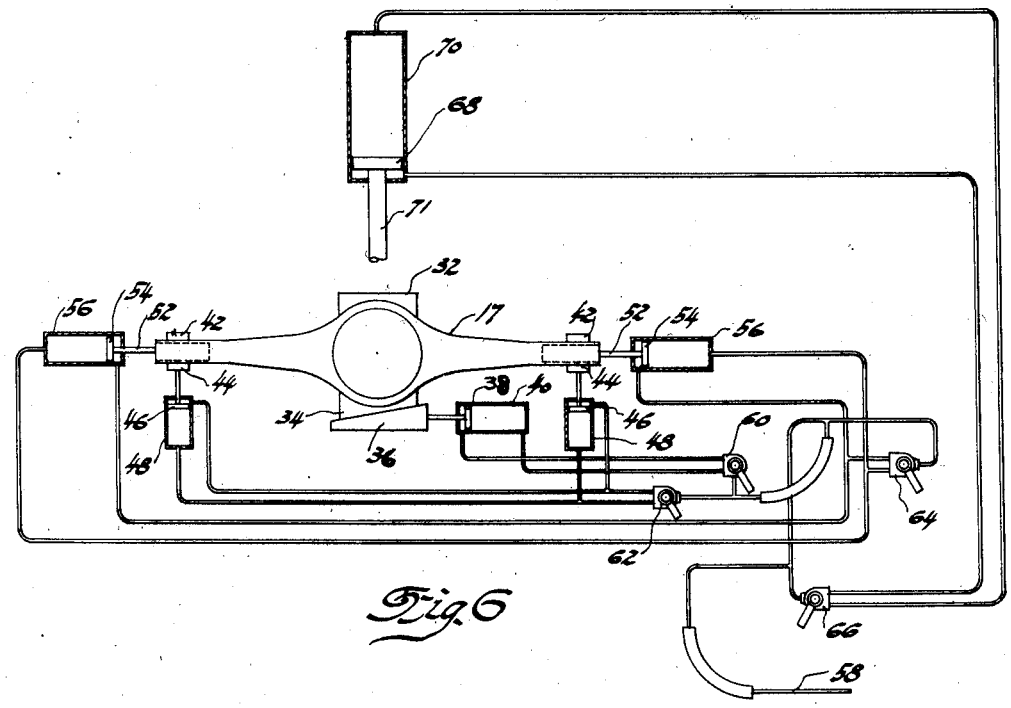
Figure 6 is a diagrammatic view showing the pneumatic system controlling the clamping means for securing the axle housing in operative position in the machine.

The pneumatic controls for actuating the pistons 38, 46 and 54 to lock the housing sections in the holder 27 are best illustrated in Figure 6. Compressed air is supplied to the system through conduit 58 which has branches leading to the valves 60, 62 and 64 controlling the flow of compressed air to pistons 38, 46 and 54 respectively. Another branch of the conduit 58 leads to valve 66 controlling the application of air pressure to piston 68 operating in cylinder 70 and connected by rod 71 to one of the struts 20 of the carriage, 16 as best shown in Figure 5, to effect reciprocation of the carriage.

The operation of this part of the mechanism is as follows:

Let us assume that carriage 16 is in its forward position with the clamps 34 and 44 released and the mandrels 50 withdrawn. This is the position which the parts occupy when a welded housing is withdrawn from the machine. The operator places a pair of housing sections in the holder 27 with one of the longitudinal seams uppermost. He turns valve 60 to move shiftable socket 34 to clamp the center of the housing and then turns valve 64 to force the expanding mandrels 50 into engagement with the ends of the axle housing. By this operation the housing is accurately centered in the machine The operator now turns valve 62 to engage clamps 44 with the ends of the housing. With the housing sections thus firmly locked in the holder 27, the operator next manipulates valve 66 to retract the carriage 16 into welding position. After welding the seam on one side of the housing, the operator manipulates valve 66 to advance the carriage 16. In this position of the carriage holder 27 may be rotated through 180° placing the opposite seam uppermost for welding and upon manipulation of valve 66 carriage 16 may now again be retracted to welding position.

Functionally the mechanism thus far described consists of a holder in which the work is clamped, arranged to permit a shifting in the position of the work to weld at a different place. In the case of an axle housing it has been found most convenient to design the work holder to permit of moving it from beneath the welding apparatus to a position in which the holder may be rotated to expose the opposite seam. The apparatus has been designed for semi-automatic operation preferably by the use of compressed air as shown to relieve the operator of arduous labor and at the same time speed up the work.

Since the axle is fixed in position during the welding operation in order to weld the seam it is necessary to move the welding apparatus along the housing. It is obvious that as an alternative arrangement it would be possible to design the electrical and mechanical apparatus so that the housing rather than the welding apparatus reciprocated but I prefer the first method because of its simplicity. The machine illustrated is provided with a pair of welding heads 72, 72' one of which is illustrated in detail in Figure 7. In designing machines for welding articles other than axle housings, it may be and frequently is necessary to employ a greater or less number of welding heads and it is to be understood that my invention in its broad aspect is capable of great variation in this respect.

Figure 4:
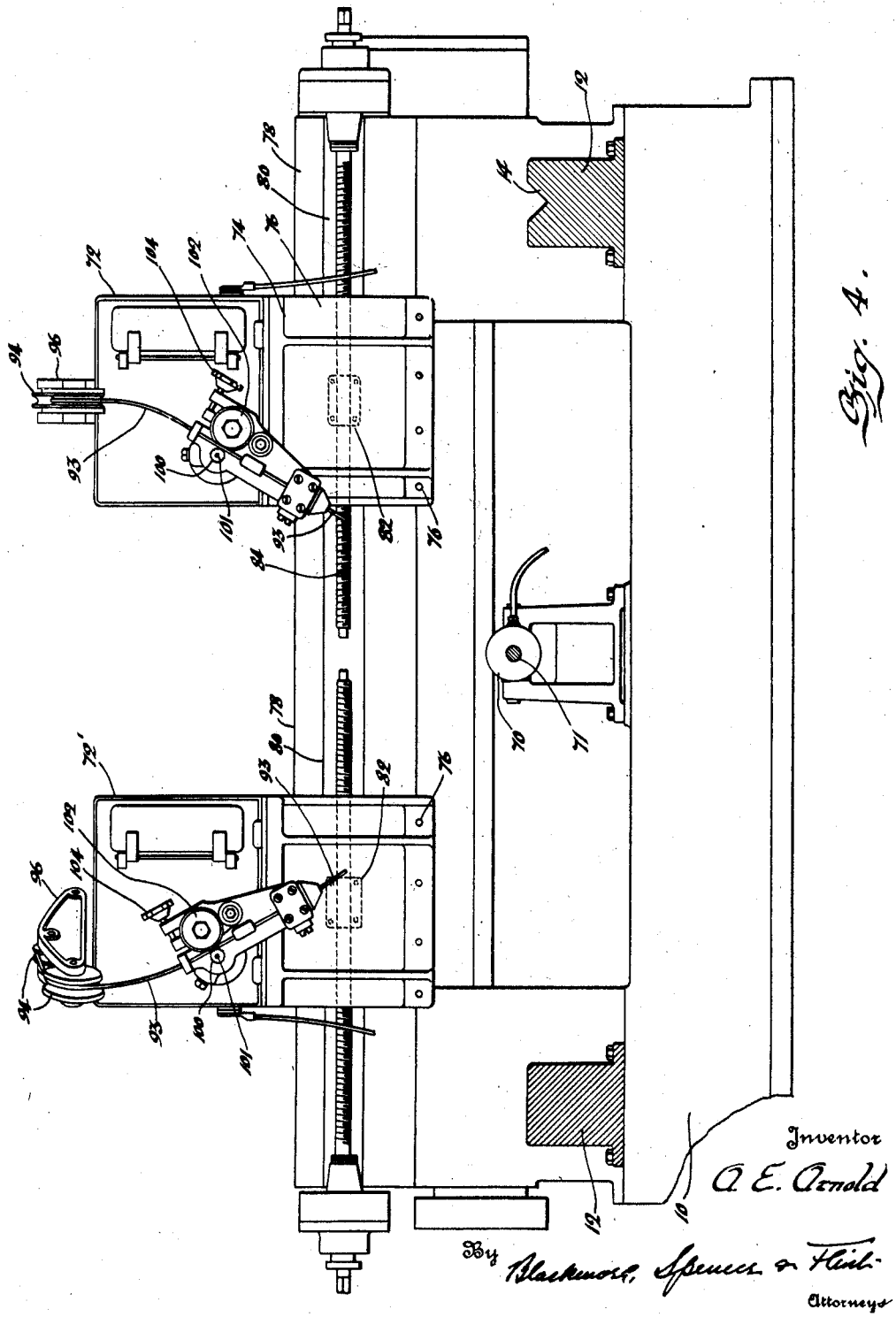
Figure 4 is a vertical section taken substantially on line 4—4 of Figure 5.

I shall now describe the mechanism by which the welding heads are reciprocated during the welding operation. This is best illustrated in Figures 4 and 5. Referring to Figure 5 one of the welding heads 72' is shown mounted on but electrically insulated from plate 74 provided with a depending member 76 guided for sliding movement on guide 78. Guide 78 is provided with a longitudinal slot 80 to receive lug 82 extending rearwardly from member 76. Lug 82 has threaded engagement with screw shaft 84 journaled in the guide. As clearly shown in Figure 4 there are two separate screw shafts, one for each welding head and these are reversely threaded. The shafts carry at their ends suitable gears 86, one of which is illustrated in dotted lines in Figure 2, driven by pinions 88 carried by shaft 90 extending across the machine. Shaft 90 is driven from the motor illustrated at 92 in Figure 2 by means of suitable gearing and belting.

There is thus provided means to reciprocate the welding heads back and forth along the work, this means being arranged so that the heads travel at all times in opposite directions. It is obvious, however, that with certain modifications in electrical connection it would be possible to arrange the heads for movement in the same direction. This, however, is objectionable for a number of reasons principally because of the mechanical stresses to which the housing is subjected owing to the unsymmetrical application of heat to the housing.

Thus it is apparent that where welding is begun simultaneously at one end and at the opposite side of the center of the housing, the contiguous portions of the housing are heated and expand setting up certain unbalanced stresses throughout the length of the housing thereby distorting it. Welding done while the housing is thus distorted is apt to be irregular and unsatisfactory and leave the housing under strains upon cooling. By my method on the contrary the welding is done simultaneously from the ends toward the center or from the center toward the ends and the stresses set up are symmetrically disposed and in effect balance each other producing a condition more satisfactory for welding and leaving the housing free from strains upon cooling.

Figure 7:
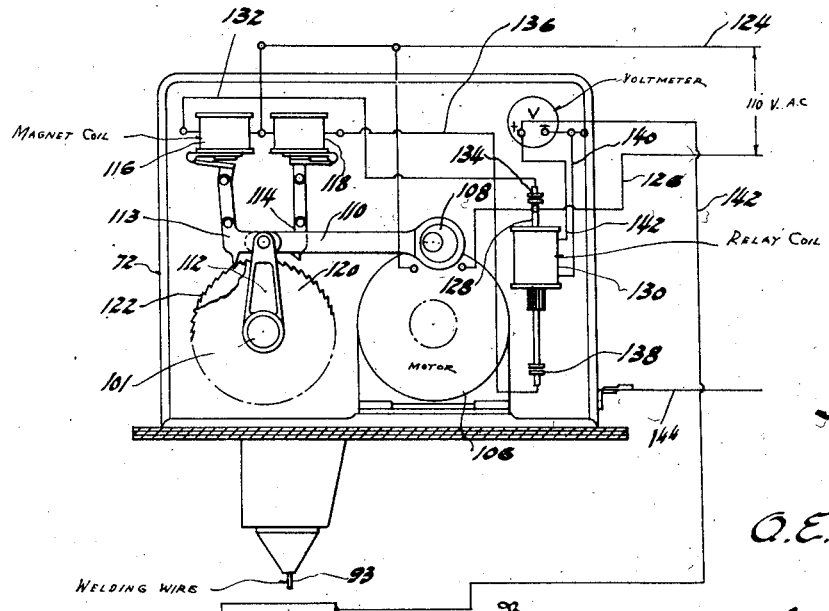
Figure 7 is an enlarged detailed view, partially diagrammatic, of one of the welding heads.

Any suitable form of welding head may be employed. The one illustrated in Figure 7 is a standard commercial design. This head is of the type in which a strip of welding metal forms one of the electrodes, the strip being automatically fed into position for welding as it is supplied to the seam. I have, however, modified the controlling circuit in the manner to be described. The welding strip or wire 93 is supplied to the head from a coil, not shown, and is then passed over pulley 94 (see Figure 2), carried by supporting member 96 mounted on pin 98 swivelled on the frame of the machine to swing in a horizontal plane to conform to the position of the head. The pulleys 94 are insulated from member 96 by intervening wooden supports 95, and as a further safeguard the standards 99 carrying pins 98 are insulated from the frame by wooden strip 97. The spool from which the wire is supplied should be insulated from ground by mounting it upon an insulating carrier. The voltage to which the welding strip is subjected ranges between 15 and 25 volts so that wood affords sufficient insulation but if desired other substances may be used.

Referring now to Figure 4 the welding head includes a knurled driving wheel 100 mounted on shaft 101. The welding wire 93 is gripped between the driving wheel and an idler 102. A hand wheel 104 is provided to adjust the degree of pressure with which the idler bears on the wire. Referring to Figure 7 shaft 101 is driven in the following manner: Motor 106 through suitable gearing rotates eccentric 108. The eccentric drives connecting rod 110 which is guided for reciprocating movement by link 112 loosely pivoted on shaft 101. To the outer end of connecting rod 110 are independently pivoted pawls 113 and 114 which are connected by suitable links to the armatures of electro-magnets 116 and 118 respectively. In its lowermost position pawl 114 is in driving relation with ratchet wheel 120 secured to shaft 101, and in this position of the parts reciprocation of connecting rod 110 produces rotation of the driving wheel 100 in a direction to feed the welding wire to the work. Likewise pawl 113 in its lowermost position is in driving relation with ratchet wheel 122 also secured to shaft 101, and in this position of parts the driving wheel 100 is driven in the reverse direction to withdraw the welding wire from the work. It is now clear that the direction of feed of the wire will depend upon which of the pawls is in engagement with its ratchet wheel and this in turn is dependent upon the energization of electro-magnets 116 and 118. By means of the following circuits the electromagnets are controlled by the voltage across the arc. As shown on the drawings, motor 106 and one side of the electromagnets are supplied with current from a suitable source,—for convenience a 110 volt alternating current line 124. The motor circuit is completed by the lead 126 which also makes contact with the armature 128 of relay 130. The other side of magnet 116 is connected by lead 132 to contact 134 located above the relay and the other side of magnet 118 is connected by lead 136 to contact 138 located below the relay. Relay 130 is connected in parallel with the arc by lead 140 connected to the frame of the welding head and lead 142 connected to the work being welded, in this case the axle housing, by being placed in conductive relation with the frame in which the housing is mounted. The direct current supply line 144 for the arc is connected to the frame of the welding head.

The operation of the welding head is as follows: When the welding line voltage is applied to the system, armature 128 of relay 130 will be moved up energizing magnet 116 thereby lifting the retracting pawl 113 and leaving the feed pawl 114 engaged with its ratchet wheel. The welding wire will then be fed rapidly toward the work until it strikes the work. When it touches the work the voltage between the work and the welding wire is reduced practically to zero and this immediately causes relay 130 to become deenergized, the armature 128 dropping to bottom position and breaking the circuit of magnet 116 causing its pawl 113 to engage its ratchet wheel, and energizing magnet 118 causing its pawl to be raised so that the welding wire is immediately withdrawn rapidly from the work thereby establishing the arc.

When enough wire is fused to lengthen the arc slightly the relay will again move up energizing electromagnet 116 causing it to raise its pawl and de-energizing magnet 118 allowing the feed pawl 114 to feed wire toward the work until the arc length is again corrected, whereupon the feed of wire to the weld continues at a uniform rate. The arc length can be adjusted by adjusting the plunger or armature of the relay so that the arc can be maintained at an average value of from 15 to 20 volts and will be maintained practically constant (within about 2 volts) at any given voltage.

While I have described in detail the form of welding head which I have employed in order to make the description of my machine clear it is to be understood that various forms and types of welding heads may be substituted, my invention relating to the way in which the control of the head is correlated with the other parts of the machine as will be later described and pointed out in the claims.

Figure 8:
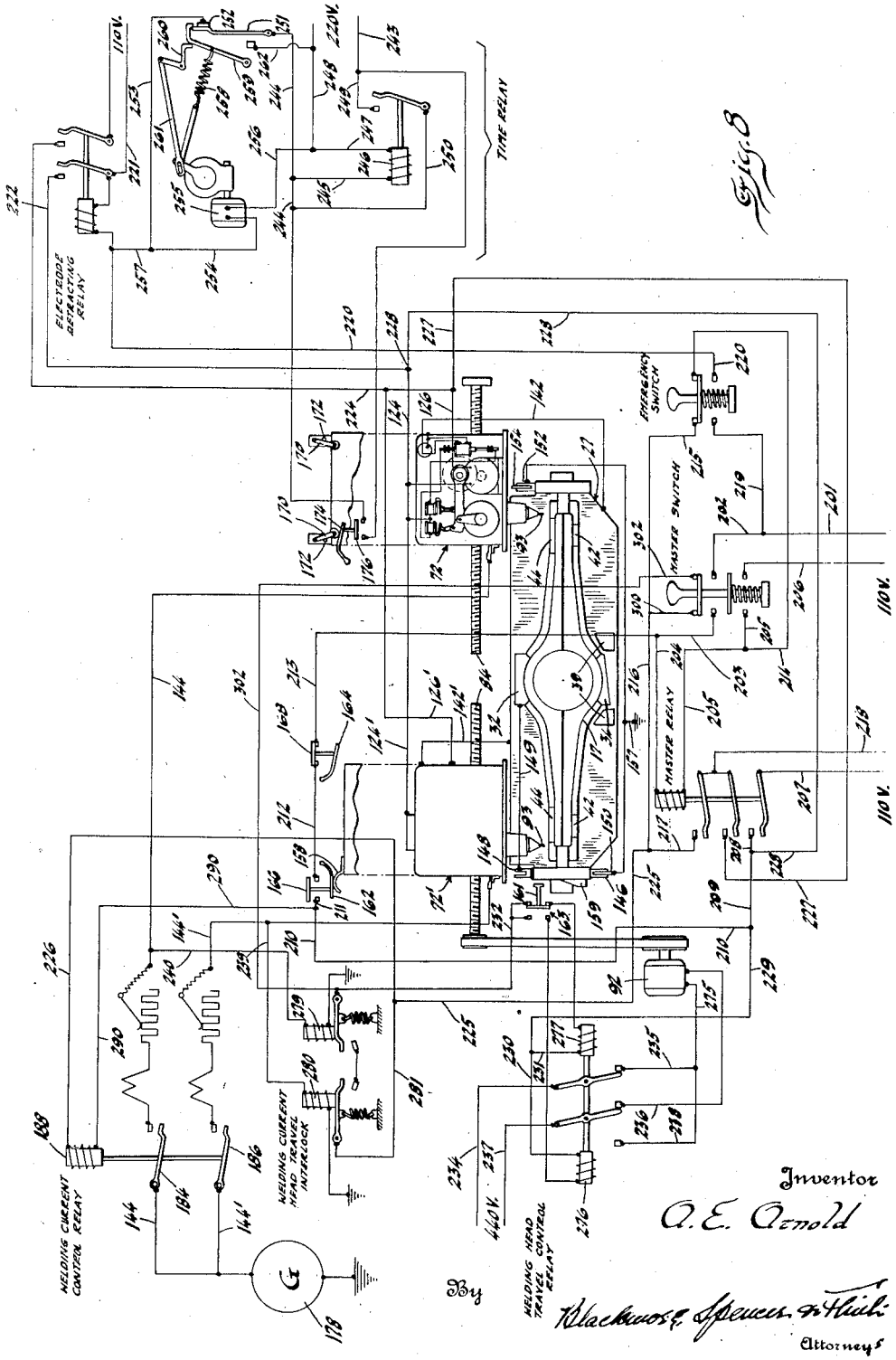
Figure 8 is a diagrammatic view of the electrical circuits together with such mechanical parts as are necessary to understand the functioning of the circuits.

The diagram of electrical connections is shown in Figure 8. Before describing the diagram in detail, attention will be called to the means used to interlock the mechanical and electrical operations. Holder 27 carries at one end and at one side of its axis, contact 146 in conductive relation therewith, and directly opposite this contact and at an equal distance from the axis, contact 148 insulated from the holder. These are best shown in Figure 3. With these contacts co-operates stationary contact 150 secured to the carriage 16. At the opposite end holder 27 carries contact 152 in conductive relation, and with this contact co-operates contact 154 secured to the carriage 16. Contacts 150 and 154 are connected to each other by conductor 156 which may be in the form of a bus-bar grounded at 157 preferably by means of a bus-bar connected to the welding current generator 178. Contact 148 is connected by means of a suitable conductor 149 with socket member 32.

Holder 27 likewise carries at one end and adjacent contact 146 cam 159 adapted to engage plunger 161 of reversing switch 163. By means of this switch the motors which cause the welding heads to travel along the housing are reversed when the housing is turned over.

The welding heads in their travel likewise energize switches as shown in Figures 3 and 8. Thus the carriage or support for welding head 72' shown in Figure 3 is provided with a projection 158 adapted to engage levers 162 or 164 respectively to open switches 166 or 168 which are normally held closed by suitable springs not shown. These switches serve as limit switches to interrupt the welding operation as will later be made clear.

The carriage or support on which welding head 72 is mounted carries pivoted members 170 having rollers at their free ends. Adjacent the members 170 pins 172 are provided. Co-operating with the pivoted members is a lever 174 pivoted on a stationary support and adapted to close switch 176 when swung downwardly. It will be noted that when the welding head travels in a direction to swing one of the members 170 against pin 172 lever 174 is depressed closing the switch. As the limit switches 166, 168 have not yet been tripped, the welding heads continue their travel for a short distance and the roller passes the high point on the lever 174 permitting switch 176 to open, thus the switches 176 remain closed for but a brief period. When the head travels in a reverse direction the member 170 which was last actuated merely swings idly out of the way without actuating the switch.

Referring now to the wiring diagram shown in Figure 8, the welding circuit will first be described. Direct current for the arc is supplied by generator 178. One side of the generator is shown as grounded. This is accomplished by direct connection to the frame of the machine by lead 157 previously described. The generator supplies current to the welding heads 72 and 72' by branches 144 and 144' respectively, containing suitable resistances and reactances as well as switches 184 and 186 controlled by relay 188. From the welding heads the current flows through the welding wire, and the arc to the axle housing. The path through the housing varies with the direction of travel of the welding heads. In Figure 8 the parts are shown in position to weld from the outer ends of the housing toward the center and contacts 146 and 150 are engaged as are also contacts 152 and 154.

Referring now to Figure 3, the path of the welding current from each arc is thru the axle housing, the expansible mandrel 50, shaft 52, holder 27 and contacts 146—150, or 152—154, to ground. There are also the following theoretically closed paths for the current to follow but owing to interposed resistances now to be described, these paths are, in effect, open circuited. In this discussion, it is to be borne in mind that the voltages involved are very low, that across the arc ranging between 18 and 24 volts. The current flowing thru the shaft 52 and journals 30 cannot pass into the carriage 16 because of the resistance of the interposed wooden bearings 28 and wooden disks 29; nor can it pass into the carriage 16 thru the rod connecting piston 54 with shaft 52 because of the small diameter of the rod and the high resistance of the oil film provided at the bearing in which the rod slides. The oil film on the piston 54, as well as the leather washer with which it is equipped, constitute a sufficiently high resistance to prevent appreciable flow of current from the piston 54 to the cylinder 56. A small amount of current may pass thru the Monel metal sockets 42 and 43 to the holder 27, and thence to the engaged contacts, but this will be practically negligible owing to the air gaps provided at 45, Figure 3a, as well as the oil films on the sliding clamps 44 and pistons 46. As the arc approaches the center of the housing, it might be thought that a large proportion of the current would pass from the housing thru the center sockets 32 and 34 to the holder 27 and thence to the engaged contacts. If this took place, the magnetic effect of the heavy flow of current would cause the welding metal to be splattered out of the seam and would result in a bad weld. With my design, little if any current will follow these paths. Current flow thru socket 32 is prevented by minimizing the area of the contacting surfaces. Thus, socket 32 is locked to the frame by means of bolts 33 leaving an air gap as at 35. Another factor is the fact that the cast iron of which the holder 27 is made is of lower conductivity than the pressed steel, of which the axle housing is composed. This, added to the fact that the path thru the socket 32 is longer, is sufficient to cause practically all the current to return thru the housing and expanding mandrel. The path thru movable socket 34 is similarly blocked by the air gap provided in the socket at 37, by the oil film provided on the sliding surfaces of the socket and by the air gaps provided at 39 at each side of the socket and sliding wedge. To these resistances are likewise added the high resistance of the cast iron compared with that of the pressed steel of the housing. With the other paths thus eliminated the welding current will take a path thru mandrels 50, shafts 52 and holder 27 to the engaged contacts 146—150 or 152—154 and thence by busbars to ground, or, actually, to the other side of the welding current generator.

After completion of the welding of the seam on one side of the housing, holder 27 is rotated through 180° breaking the contacts at 146—150 and 152—154 and closing the contact at 148—150. The rotation of the housing has likewise caused cam lug 159 to operate reversing switch 161 reversing the connections of the motor driving the welding heads as will be later described. Contact 148 is insulated from member 27 as previously described and is connected by lead 149 with the socket member 32 so that as the welding heads travel from the center to the ends of the housing the welding current travels toward the center of the housing through socket member 32, lead 149, contacts 148 and 150 to ground or, in practice the other side of the generator. There is, in this case, no alternative path for contact 148 is insulated from the holder 27.

With the described circuits it is apparent that the ground connection is always at the end which the head is leaving and consequently there is little or no disturbance of the molten metal in the seam by the magnetic field accompanying the current flow.

Next the welding head feed control circuit will be described. It is essential that this circuit be arranged not only for operation in normal fashion to feed the electrode during the actual welding operation, but it must also operate to withdraw the electrode wire an appreciable distance from the work to afford sufficient clearance to permit withdrawal of the housing and its holder for rotation to expose the opposite seam to the welding apparatus or to permit the removal of the housing from the holder. Reverting to the description of the head shown in Figure 3, it will be remembered that the electrode feeding mechanism was supplied with current by conductors 124 and 126. Leads 126 and 126' are tied in together as shown and are connected to the master relay by conductor 227. The master relay when energized connects conductor 227 with a suitable source of current through lead 218.

Leads 124 and 124', likewise tied in together, are connected by lead 228 to terminal 208 of the master relay which, when the master relay is energized is connected to the other side of the line by conductor 207. With the circuits described it is apparent that upon energization of the master relay current is supplied to the feed mechanism of the welding heads whereupon an arc is automatically formed and maintained.

Leads 126 and 126' are likewise connected by conductor 224 to a 110 volt supply line, by way of contacts controlled by the electrode retracting relay. Leads 124 and 124' are correspondingly connected by conductor 222 to the other side of the supply line by way of a contact controlled by the same relay. If desired a single switch can be operated by the relay instead of the double switch. Two circuits are provided for actuating this relay. The first to be described places the relay under control of the emergency switch. This circuit is from supply line 201 at the bottom right center, lead 219, emergency switch, lead 220 to supply line 221. By this circuit as long as the emergency switch is depressed the electrode retracting relay is operated to withdraw the electrode from the work.

The circuit next to be described causes the control circuits 124′ 126′ and 124—126 to be energized near the end of the travel of the welding heads to retract the electrodes a certain definite amount. This is accomplished by causing one of the heads before the end of its travel to close the circuit of a definite time relay which maintains the circuit closed for a definite interval. The relay which I have employed is known as an alternating current definite time relay. This relay is indicated diagrammatically at the extreme right hand side of Figure 8. It is preferably operated by a current from a 220 volt AC line although this is not essential. One side of the supply line is indicated by reference character 243 and the other side by reference character 248. The relay is under the control of switch 176 previously described, which is closed for an instant adjacent each end of the travel of the head. When the switch 176 is closed the current flows from line 243 through switch, lead 245, electro magnet 246 and lead 247 to the other side of the line 248. Electromagnet 246 now pulls up its armature closing shunt circuit 249, 250 in parallel with the circuit containing switch 176 thus locking in the time relay circuit. Current is likewise supplied from lead 244 through trip switch lever 251, contact 252, leads 253 and 254 to motor 255 thence by lead 256 to the other side of the line. At the same time current is supplied from line 253 through lead 257 to the electrode retracting relay, causing it to pull up closing the contacts supplying current to the welding head control circuits. While the welding wire is being retracted motor 255 continues to rotate and through spring 258 applies tension to trip lever 259 which however, is held locked in position by latch 260 connected to a crank on the motor shaft by sliding link 261. When the pin on the crank reaches the end of the slot latch 260 is withdrawn, permitting trip lever 259 to be drawn sharply to the left by spring 258 breaking the contact at 251—252. This results in breaking the motor circuit causing the motor to stop, breaking the circuit of the electrode retracting relay, and at the same time trip switch 251 engages contact 262 short-circuiting electro magnet 246 causing it to release its armature breaking the locking circuit of the magnet. A return spring, not shown, is provided for returning the parts operated by motor 255 to their original position. It is to be understood that the time relay illustrated is one of many that might be used for the purpose and my invention is in no sense limited to the use of this particular construction.

Figure 1:
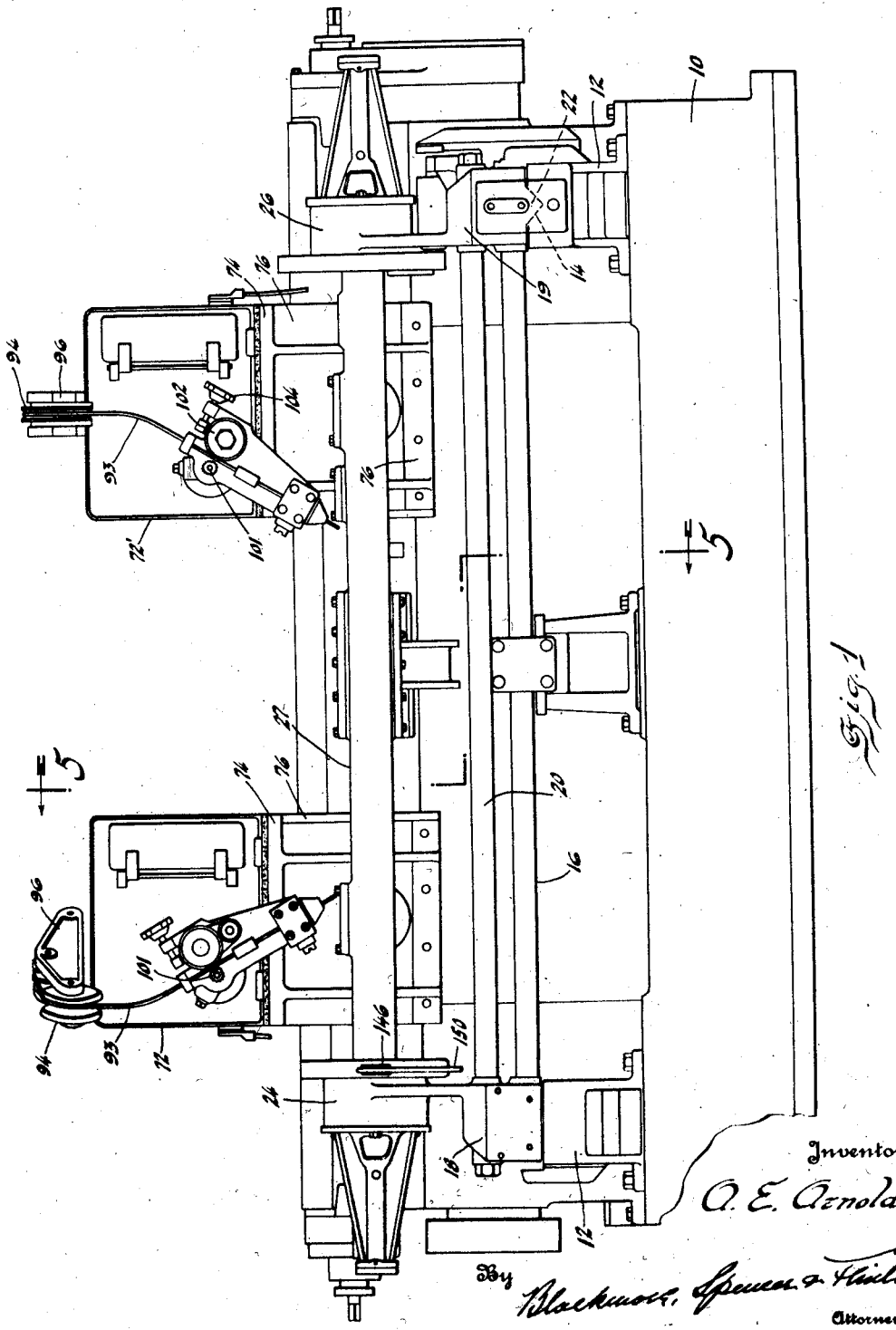
Figure 1 is a front view of the machine with an axle housing in place for the welding operation.
Figure 2:
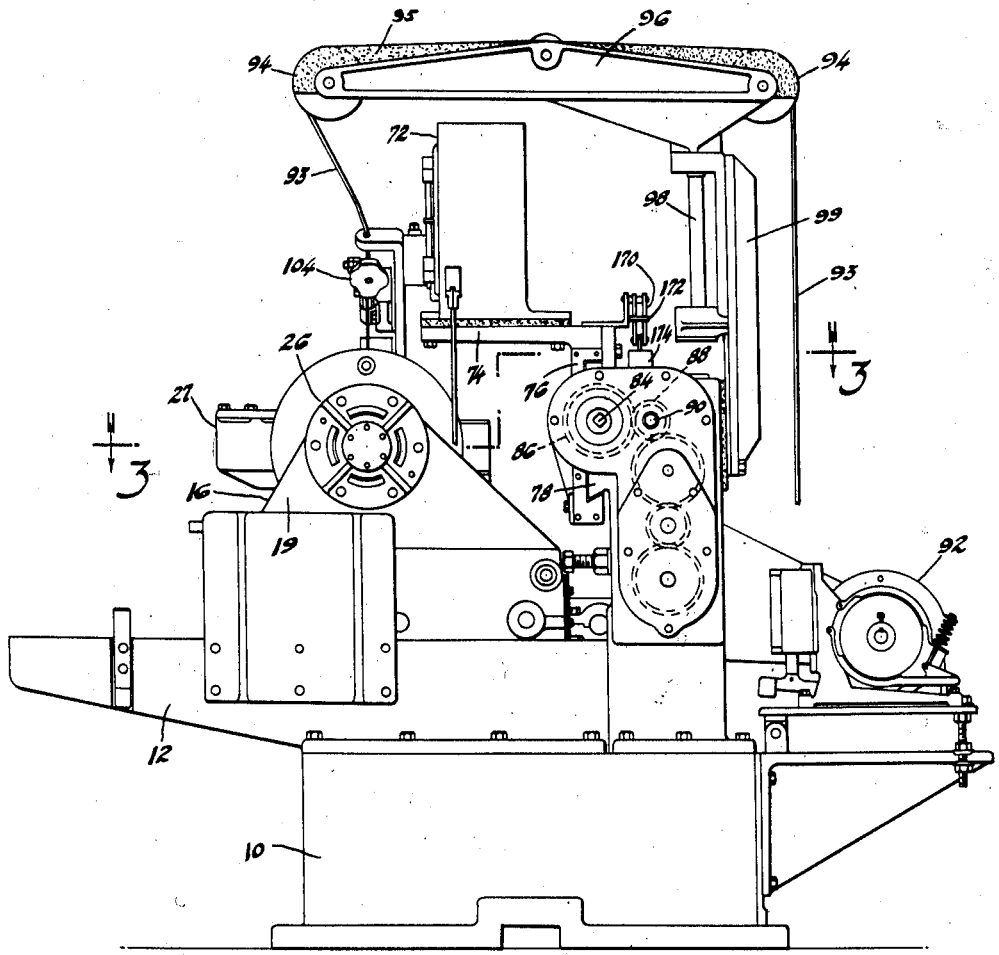
Figure 2 is a view looking at the right hand end of Figure 1.

The circuits for energizing the motor to cause the welding heads to travel back and forth will now be described. It will be remembered that the welding heads are guided for movement lengthwise of the housing and are driven by screw shafts 84 driven by suitable means from the motor 92 as shown in Figure 2. In the diagram, Figure 8, a simple belt drive has been indicated. Motor 92 is supplied with current preferably from a 440 volt circuit by the following path; supply line 237 at the left center of Figure 8, contacts of welding head travel control relay, lead 236, motor 92, lead 275, lead 235, relay contacts to supply line 234. When the opposite electromagnet of the welding head travel control relay is energized current flows in a reverse direction through the motor as follows: lead 237, relay contacts, leads 238, 275, motor 92, lead 236, relay contacts, lead 234. The motor now rotates in reverse direction. Electromagnets 276 and 277 of the welding head travel control relay are energized alternately depending upon the direction of travel of the welding heads in the following manner. Current is supplied to the electromagnets from supply line 207, lowermost contacts of the master relay, leads 208, 209, and 229 and either 230 to magnet 276 or lead 231 to magnet 277; leads 230 and 231 extend to contacts of reversing switch 163 from which extends lead 232.

Functionally the travel control relay must be interlocked with the welding circuit of both heads 30 that the heads will not begin to travel until the welding arc is struck. To accomplish this lead 232 is connected with contacts bridges by the armatures of the welding current—head travel interlock relays 279 and 280. Relay 279 is connected across the arc supplied by line 144 by means of lead 240 and a ground connection, while relay 280 is similarly connected with respect to line 144′ by lead 239. The contacts of relays 279 and 280 are arranged in series so that the circuit of the welding head travel control relay is not completed unless both relays have been de-energized by the drop in voltage (from 60 volts to 18–26 volts) resulting from striking the arcs. From the relays current flows by leads 281, 225 and 217 to the upper contact of the master relay and thence by lead 218 to the other side of the supply line.

I have provided means to render relays 279 and 280 ineffective after the arc has been struck to prevent stopping of the travel motor in case of variations in the arc voltage during welding. This I have have accomplished by conductors 300 and 302 leading to the top contacts of the master switch. These contacts are bridged by the master switch in its open position and in this position of the parts, the conductors, contacts and master switch constitute a circuit in parallel with the contacts controlled by relays 279 and 280 so that should the relays pull up as a result of considerable variation in the arc, or even breaking of the arc, the travel motor circuit will not be broken.

It will be remembered that the welding circuit control relay 188 controls switches 184 and 186 in the respective welding circuits. This relay is supplied with current by the following circuit: lead 207, lowermost contacts of the master relay, leads 208 and 209, 210, 290, the relay, leads 226, 225, 217, the uppermost contact of the master relay, and lead 218 to the other side of the line. By this means it is apparent that as long as the master relay is energized the welding circuits will be maintained closed.

I have so far described the various unit circuits entering into the operation of the machine. I shall now describe the manner in which the various circuits are interlocked and the manner in which they are controlled by the master switch, master relay and emergency switch. This description will be accompanied by a general statement of the operation of the machine.

Let it be assumed that the operator has placed a pair of housing sections in the holder 27, clamped them in position and moved the holder beneath the welding heads by means of the pneumatic apparatus previously described. The welding heads are in position to weld from the ends of the housing toward the center as shown in Figure 8. The operator now depresses the master switch, holding it depressed until the welding heads move away from starting position. When the master switch is depressed the master relay is energized through the following circuit: One side of supply line 201, 202, upper contacts of master switch, leads 203, 204, master relay, lead 205, lowermost contacts of master switch, lead 206, to the other side of the line.

Upon the closing of the master relay current is supplied;

(1) To the welding current control relay closing the welding circuit by the following path: suppply line 207, lowermost contact of master relay, leads 208, 209, 210, 290, relay coil, 226, 225, 217 uppermost contact of master relay to the other side of line 218. The welding current control relay now pulls up closing the welding circuits as follows: (a) ground, generator 178, lower contact of relay 188, lead 144', welding head 72', arc, axle housing end clamp and socket 42—44, holder 27, contacts 146—150, bus bar 156—157 to ground; (b) ground, generator 178, upper contact of relay 188, lead 144, welding head 72, and thence by the same path as given above to ground.

(2) To the welding head feed circuit by the following path: Line 207, lowermost contacts of master relay, leads 208, 228, thence either by line 124', welding head 72' and lead 126' or by line 124, welding head 72, and lead 126 to lead 227, middle contacts of the master relay to the other side of the line 218. The welding head mechanism is now actuated to feed the electrode wire downwardly until the arc is struck as described in connection with the description of the welding head.

(3) To the motor 92, to cause the heads to travel toward the center of the housing, by the following path: line 207, lowermost contacts of master relay, leads 208, 209, 229, 230, 231, electromagnet 277, reversing switch 163, lead 232, contacts of relays 279 and 280, lead 281, 225 and 217, uppermost contact of master relay to return line 218. It will be noted that this circuit is depended upon the releasing of the welding current-head travel interlock relays 279, 280, which are deenergized only when the arc is struck in the welding circuit as previously described.

When the welding heads leave starting position, the operator may release the master switch and the welding proceeds, the master relay having locked itself in by the following circuit: line 207, lowermost contact of master relay leads, 208, 209, 210, 211, limit switch 166, lead 212, limit switch 168, leads 213, 204, master relay, leads 205, 214, upper contacts of emergency switch, leads 215, 216, 217, uppermost contacts of master relay to line at 218. The inclusion of the emergency switch in this circuit permits the breaking of all of the circuits at any time by pressing the emergency button. The return of the master switch to open position likewise results in closing the top contacts, completing a circuit thru leads 300 and 302 in parallel with the contacts controlled by the welding current-head travel interlock relays 279 and 280 so that should these magnets pull up as a result of variations in the voltage in the welding circuit, the circuit of the travel motor will not be broken. Obviously, if preferred, conductors 300 and 302 and the top contacts of the master switch may be omitted. In such case, relatively sluggish or delayed action relays may be employed at 279 and 280 so that the magnets would not pull up as a result of minor variations in the welding voltage, but would pull up in case of prolonged breaking of the arc. When the emergency switch is operated, the following circuit is likewise closed energizing the electrode retracting relay; leads 201, 219, emergency switch, lead 220, electrode retracting relay to line 221. This circuit is also shown arranged to actuate the time relay mechanism previously described to cause the wire to be retracted a given amount. The energization of the electrode retracting relay closes the following circuit causing the welding wire to be withdrawn from the work: line 221, left contact of retracting relay, lead 222, and either 124, welding head 72, 126, or 124' welding head 72', 126' and 224, the right hand contact of retracting relay to line.

Assuming that the emergency relay has not been operated, upon the welding heads reaching a point very near the end of their travel the right hand lever 170 carried by welding head 72 engages lever 174 momentarily closing switch 176 energizing the time relay circuit previously described, causing the electrode retracting relay to pull up closing the welding head feed circuits to retract the electrodes a given distance from the work. With the breaking of the arcs relays 279 and 280 pull up breaking the circuit of head travel motor 92. Immediately after this, member 158 on welding head 72' engages limit switch 168 to open the locking circuit for the master relay. The falling back of the master relay causes the welding current control relay to become de-energized breaking the welding circuit. At the same time the supply of current through the master relay to the feeding mechanism of the welding heads is interrupted.

The operator now manipulates the pneumatic control and causes the carriage 16 to slide forwardly whereupon he rotates holder 27 through 180° thereby breaking contact at 146—150 and 152—154 and making contact at 148—150 to cause the welding current to flow to ground through the center of the housing on the subsequent operation of welding from the center to the ends. At the same time cam 159 trips reversing switch 163 setting the welding head travel control relay circuit so that current flows through electromagnet 276 instead of through electromagnet 277 pulling the armature to the left reversing the connections of the welding travel motor 92. The apparatus is now set for welding from the center to the ends and this may be accomplished as before by holding the master switch engaged for sufficient time for the welding heads to leave their initial position whereupon the master relay locks itself in as before.

I have described in detail the construction and operation of a specific machine designed for the welding of automobile axle housings. It is obvious that the principles employed in the design of this machine are equally applicable in building machines for the welding of articles of various shapes and sizes. In the claims hereto appended, I have defined the invention herein disclosed so as to cover various forms which my invention may assume in the hands of a skilled designer.

A feature of my invention to which I desire to call special attention is that the welding heads preferably travel in opposite directions as in the case of the axle housing herein disclosed. Thus, where opposite seams of a box are being welded the welding heads should traverse the work in opposite directions, that is, if the head at one of the seams moves from right to left, the head at the opposite seam should move from left to right. This affords the advantage that the buckling at one seam caused by the heat of the weld is balanced by the buckling at the opposite seam, this minimzing the stresses and distortion and permitting the connecting seams to be welded with less difficulty.

It will be understood, of course, that the 110 and 220 volt supply lines disclosed on the wiring diagram are not separate supply lines, but are connections from a conventional commercial 110—220 volt A. C. three wire system.

I claim:

1. In a welding machine for work presenting a seam to be welded, welding heads for said seam, a welding circuit for each of said heads and in which said heads are included for establishing a welding arc at the work, said circuit having ground connections at opposite ends of the portion of the seam welded thereby, the ground connection at the end of the seam from which the head is traveling being normally closed while the other connection is normally open, means for causing said heads to travel simultaneously along the work, means for reversing said ground connections, and means for simultaneously reversing the direction of movement of said head travel causing means.

2. In the combination as defined in claim 1, each of said reverse means comprising a holder in which said work is mounted, said holder being shiftable to reverse the work to weld the seam on the opposite side thereof, said reversing means being controlled by the position of said holder.

3. In a welding machine for work substantially symmetrical about a transverse plane and presenting a seam to be welded intersecting said plane of symmetry, a plurality of welding devices for welding said seam, and means for simultaneously moving said heads toward and from said plane in opposite directions during the welding operation to prevent the development of unbalanced strains in the work as a consequence of the heat of welding.

4. In a welding machine for work having a seam to be welded, a welding head including a welding circuit, means for producing relative movement of the welding head and work including a motor, interlocking means co-operating with said last named means and with said head to cause movement of said head only when the arc is struck, operator controlled means for initiating the welding action, and means set in action by said operator controlled means for automatically continuing the welding action.

5. In a welding machine for work having a seam to be welded, a welding head including a welding circuit, means for producing relative movement of the welding head and work including a motor, interlocking means co-operating with said last named means and with said head to cause movement of said head only when the arc is struck, operator controlled means for initiating the welding action, and means set in action by said operator controlled means and movement of said head from initial position for automatically continuing the welding action.

6. In the combination as defined in claim 5, said last named means including a self-locking relay.

7. In a welding machine for work having a seam to be welded, a plurality of welding heads of the metallic electrode type for welding said seam, welding circuits for the welding heads means for producing relative movement of said welding heads and said work to weld along the seam, interlocking means between said last named means and the heads to cause movement of said parts only when the arcs are struck, an operator controlled circuit co-operating with said heads to initiate the welding action and with said first named means for causing relative movement of the parts, and an interlocking relay energized by said operator-controlled means adapted to automatically hold said last named circuit closed.

8. In the combination as defined in claim 7, said work being shiftable to present another seam for welding, said welding circuits being provided with reversible ground connections and means operated by the shifting of said work for reversing the ground connections of said welding head circuits.

9. In the combination as defined in claim 7, and an emergency switch controlling said interlocking relay for releasing the latter to interrupt the welding action and the movement of said parts.

10. In the combination as defined in claim 7, means effective at the end of the path of travel co-operating with the welding heads and arranged to withdraw the electrodes an abnormal distance from the work to permit withdrawal of the latter.

11. In a welding machine for work having a seam to be welded, welding circuits, a plurality of welding heads of the metallic electrode type one in each of said circuits for welding said seam, said circuits being provided with reversible ground connections, means including an electric motor and a circuit therefor for moving said heads along the work to weld the seam, interlocking means between said motor circuit and the welding circuits to cause movement of the heads only when the arcs are struck, means effective at the ends of the seam for interrupting the welding circuits and the motor circuit, said work being shiftable to present another seam to be welded, and means operated by shifting of said work for reversing the ground connections of said welding circuits, and means operated by shifting of said work for reversing the connections of the circuit of said travel motor.

12. In a welding machine for work presenting a plurality of seams to be welded, a welding head for each of said seams including a circuit for establishing a welding arc at the work, means for causing said heads to travel simultaneously along the work, and interlocking means between said circuits and said first named means to prevent movement of said work when either of said arcs fails.

13. Welding apparatus including a metallic electrode and means for feeding the electrode to the work, means for causing the welding apparatus to travel along the seam to be welded, and means effective at the end of the path of travel of said welding apparatus for causing said feeding means to withdraw the electrode an abnormal distance from the work to permit shifting of the latter.

14. In the combination as defined in claim 13, said last named means including an electric circuit actuating said feeding means, and a time operated relay for determining the period of closing of said circuit.

15. Welding apparatus including a metallic electrode and automatic means for alternately feeding the electrode to the work and withdrawing it therefrom to maintain the arc throughout the length of the weld and compensate for variation in resistance in the arc, and means for actuating said last named means to withdraw said electrode an abnormal distance from the work to permit shifting of the latter.

16. In the combination as defined in claim 15, said means including a definite time relay for controlling the period of time during which current is supplied to said electrode feeding means.

17. In a welding machine for work having a plurality of seams to be welded, welding means including a welding head of the metallic electrode type, a welding circuit for the welding head provided with reversible ground connections, means for moving the welding head along a seam, a holder for said work, said holder being shiftable to present another seam for welding, means operable by shifting said holder to reverse the ground connections of said welding circuit, and means for simultaneously reversing the action of said moving means to set the machine for welding in a reverse direction along another seam.

18. In a welding machine, a welding head, means for supplying welding current to the head, means for causing relative movement of the head and the work, and interlocking means between said current supply means and said last named means for preventing relative movement of the parts when the welding current is interrupted, said interlocking means comprising a slow acting relay non-responsive to momentary fluctuations in the welding current.

In testimony whereof I affix my signature.

ALFRED E. ARNOLD.